May 1, 1928.  
E. R. FELLOWS  
MACHINE FOR GRINDING GEARS AND THE LIKE  
Filed Aug. 6, 1926  
1,667,727  
5 Sheets-Sheet 1
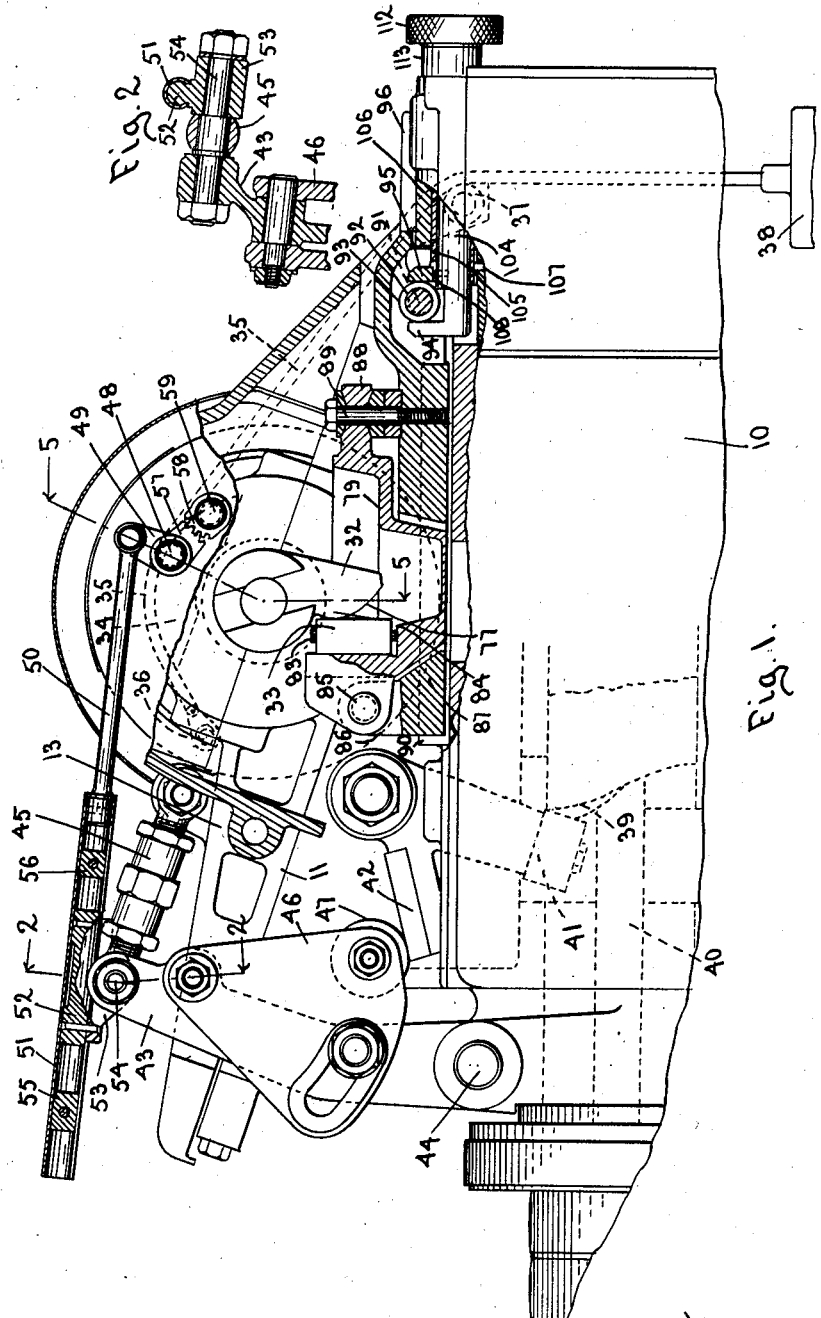
INVENTOR  
Edwin R. Fellows  
by *[signature]*  
att'ys

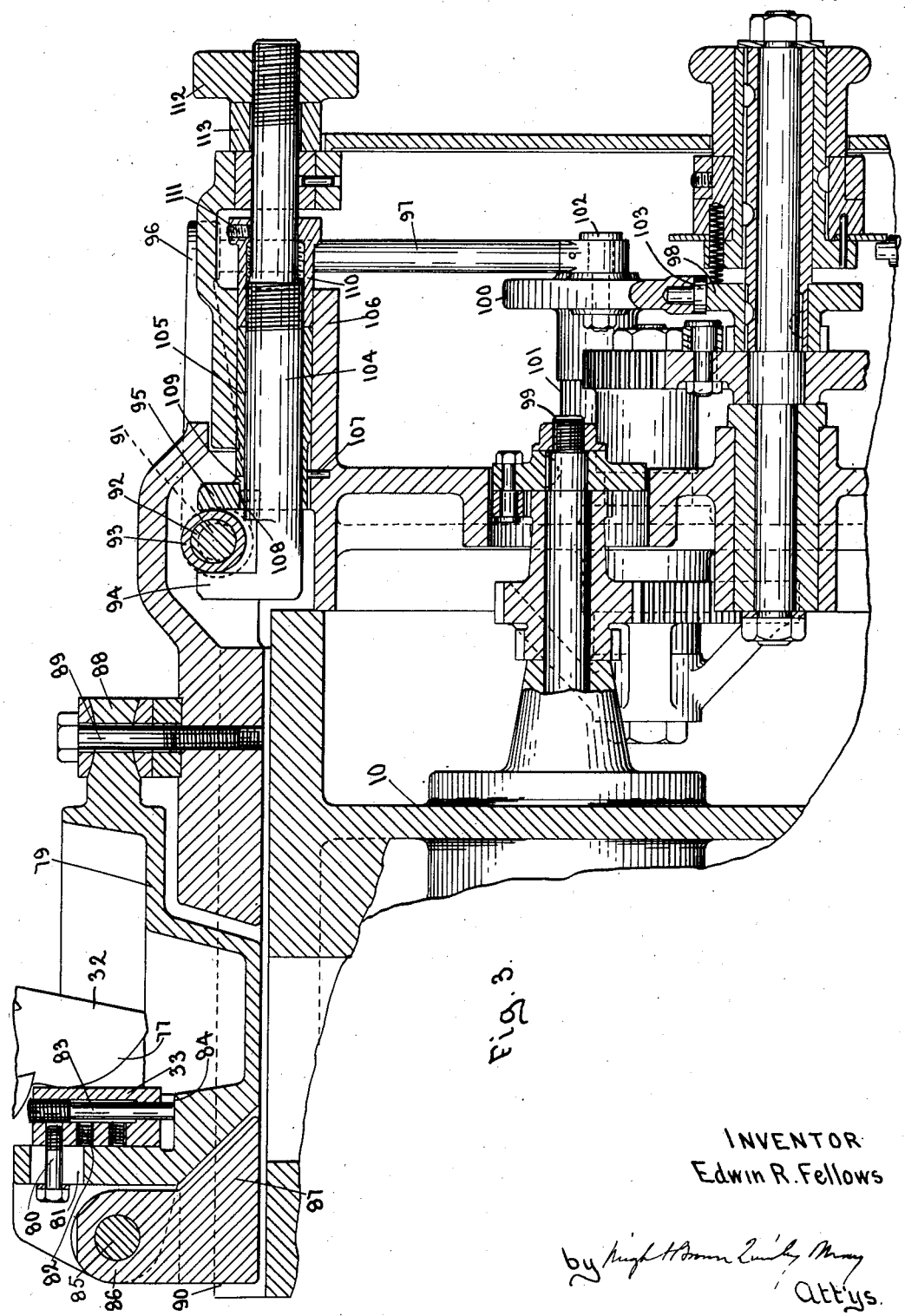

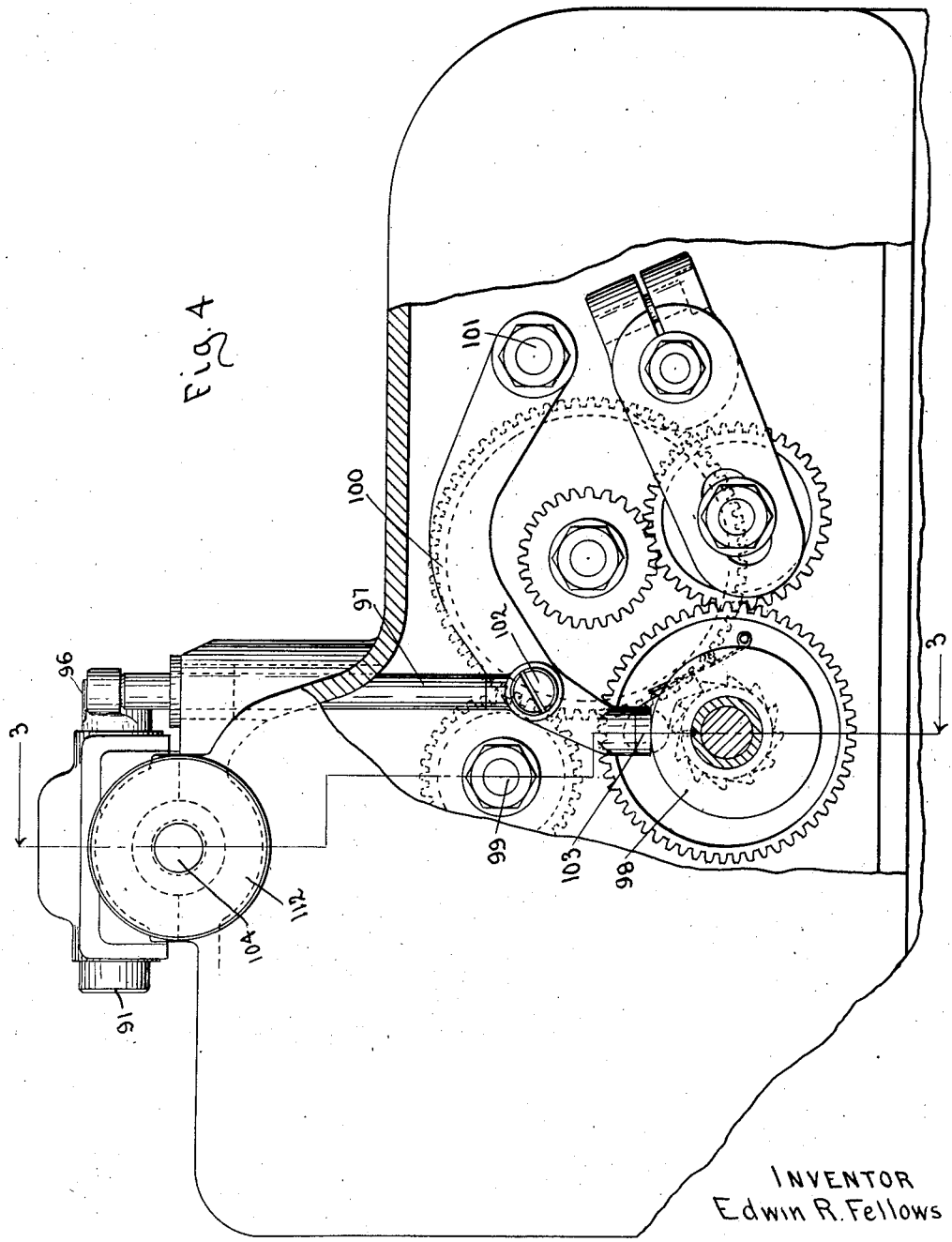

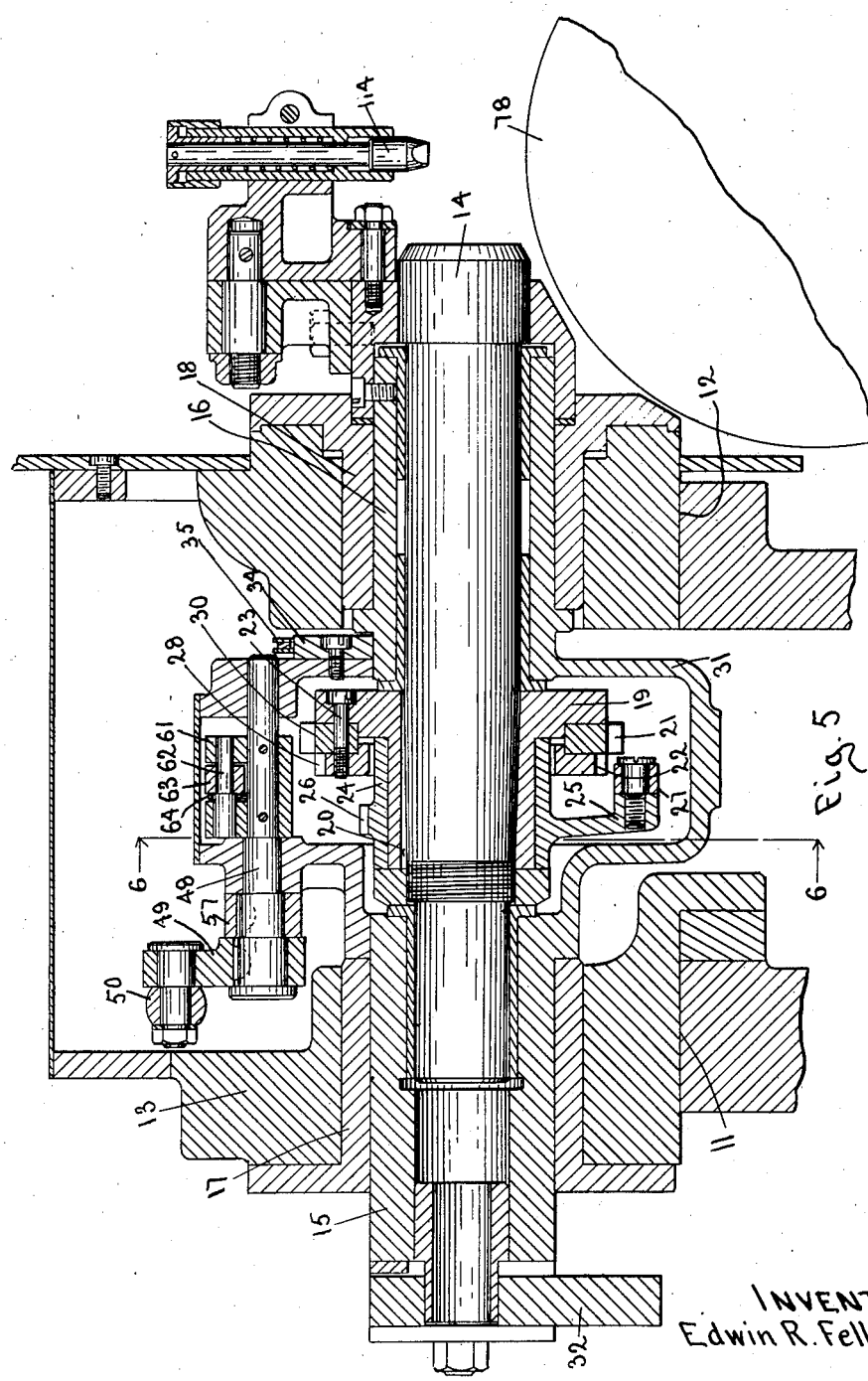

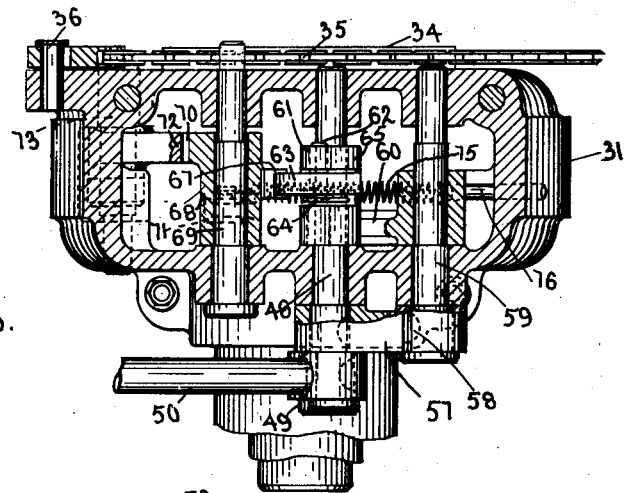
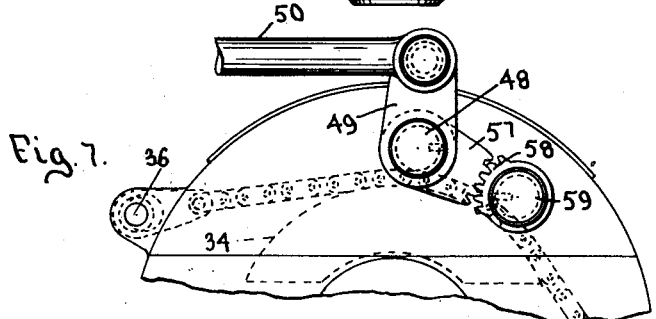
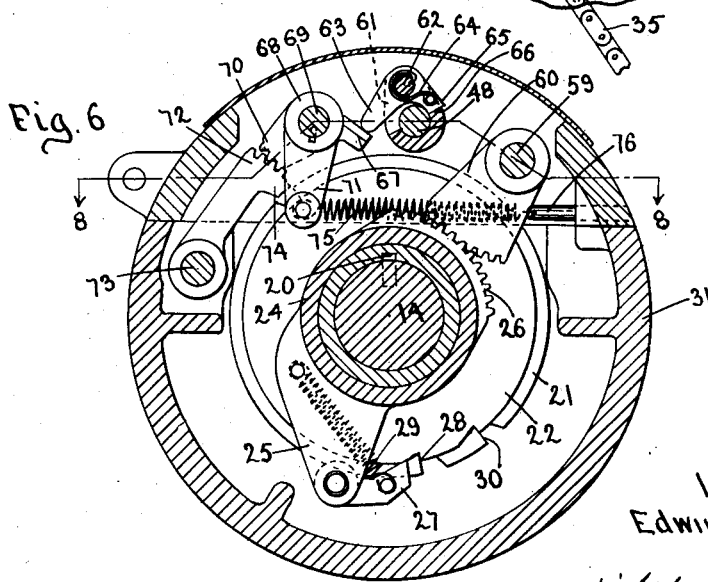

Patented May 1, 1928.

1,667,727

UNITED STATES PATENT OFFICE.

EDWIN R. FELLOWS, OF SPRINGFIELD, VERMONT, ASSIGNOR TO THE FELLOWS GEAR SHAPER COMPANY, OF SPRINGFIELD, VERMONT, A CORPORATION OF VERMONT.

MACHINE FOR GRINDING GEARS AND THE LIKE.

Application filed August 6, 1926. Serial No. 127,565.

The present invention relates to a grinding machine particularly adapted for generating and finishing to true and accurate shape, by grinding, the teeth of gear wheels and analogous articles. Within the scope of the term "analogous articles" I include such articles as have projections capable of being ground and finished by means and mechanism of the nature herein disclosed. The type of machine to which the invention is applied is one in which a relative travel, with simultaneous partial rotation about the axis of the work piece, is caused to take place between the work and grinding wheel or cutter; and the rotary movement is controlled by a formed machine element connected to the rotative element and caused to roll against the face of an abutment in the course of the reciprocative travel between the work and cutter.

While machines of this type are usable for the purpose of making other specific articles than gear wheels, yet, since I have chosen for illustration in this specification a machine designed for the specific purpose of producing gears, I will hereafter in this specification usually refer to the machine as a gear grinding machine, and to the work produced as a gear or gear wheel. Notwithstanding this, however, it is to be understood that the protection which I claim is of a scope corresponding with the preceding statement as to the nature and utility of the machine.

I use as the operative tool in the machine here illustrated, as well as in other machines of the same general type disclosed in prior applications filed by me, an emery wheel having its active face in a plane perpendicular to its axis; such tool being used on account of its well known capacity for cutting finely and accurately, and the ease with which it may be brought back to a true and sharp cutting condition after wear. But the protection which I claim is not limited by or to the use of an emery wheel and no other tool as the cutting element, and such protection includes such other types of cutting tool as may be used in an equivalent way.

More particularly the embodiment of the invention herein illustrated is based on the machine disclosed in my prior application for Letters Patent of the United States filed October 18, 1922, Serial No. 595,304, to which reference is hereby directed for explanation of parts of the machine not illustrated in the present specification and drawings.

The object of the present invention is to provide, for use with machines of the type hereinbefore referred to, and other analogous machines, a simple and improved means for automatically indexing the work to present a new tooth to the cutting tool after finishing each preceding tooth; to provide a simple, efficient and delicate means for adjusting the abutment which controls the rolling action of the formed machine element previously referred to (which element I call for convenience of description a "former"); and to apply other improvements as hereinafter described. The invention consists in the new means for accomplishing the foregoing objects, not only in the particular form herein illustrated, but in all equivalent constructions and arrangements.

In the drawings.—

Fig. 1 is a side elevation, with parts broken away and shown in section, of so much of a gear grinding machine of the type shown in my application above identified as is necessary and sufficient for explanation of the present invention;

Fig. 2 is a fragmentary cross section taken on line 2—2 of Fig. 1;

Fig. 3 is a longitudinal section on a larger scale of the abutment adjusting means;

Fig. 4 is a front elevation of a part of the machine with the outer wall of the base broken away to show the mechanism by which the adjustment of the abutment is effected;

Fig. 5 is a cross section of the indexing mechanism taken on line 5—5 of Fig. 1;

Fig. 6 is a section of the indexing mechanism in a longitudinal plane of the machine taken on line 6—6 of Fig. 5;

Fig. 7 is an elevation of a part of the indexing mechanism;

Fig. 8 is a sectional plan of the indexing mechanism taken on line 8—8 of Fig. 6.

Like reference characters designate the same parts wherever they occur in all the figures.

The base of the machine is indicated in a fragmentary way by the numeral 10. It supports on its upper part inclined guideways 11, 12 (Figs. 1 and 5), on which a carriage 13 is mounted in a sliding manner. In this form of the invention the carriage holds the work spindle 14 (Fig. 5) to which the work piece is attached, and gives translative, oscillative and rotary indexing motions to the spindle.

As shown in Fig. 5, the spindle is rotatably mounted in bearing sleeves or quills 15 and 16, which in turn are rotatably mounted in bearings 17 and 18 in the carriage. There is mounted in the spindle 14 a head 19, secured by a key 20, or otherwise, so that it cannot rotate on the spindle, and to this head are secured a notched index plate 21 and a ratchet 22; these last two members being formed as rings fitted together and to the head, and secured by bolts 23, as shown in the drawing. A sleeve 24 is fitted in a freely rotatable manner on the hub portion of the head 19 and on such sleeve is mounted, preferably as integral parts thereof, a pawl carrier 25 and a gear segment 26. A pawl 27 is pivoted to the pawl carrier and cooperates with the teeth 28 of the ratchet 22, being held against the circumference of the ratchet by a spring 29, as shown in Fig. 6. There are as many teeth 28 on the ratchet and notches 30 in the index plate as there are teeth in the gear to be finished, although, for simplicity, only a few of them are shown.

A housing 31 surrounds and encloses the head 19 and the parts adjacent thereto, and is connected with the quills 15 and 16 to turn, and turn with, the latter. The end of quill 15 opposite to the work holding end of spindle 14 projects from one side of the carriage and to it is secured the formed machine element or former 32 which controls the rolling motion of the work. This former bears against the face of an abutment 33 which is mounted in a normally stationary but adjustable manner on the base of the machine.

There is secured to the housing 31 a drum or pulley segment 34 concentric with the axis of the spindle and former, over which passes a chain or cord 35 made fast at the point 36 to the housing and extending downward and around a guide 37 to a location where it is able to support a weight 38 clear of interference with other parts of the machine. The pull of the weight constantly tends to rotate the housing 31 and the parts contained therein, and is resisted by the abutment 33 against which the former is thus caused to bear and remain in contact. The weight also tends to pull the whole carriage downward on the guideways.

Reciprocative movement is imparted to the carriage from a cam 39 (Fig. 1) driven by the main shaft 40 of the machine, acting through a lever having two arms 41 and 42, a lever 43 pivoted to the base at 44, and a link 45 pivoted to the lever 43 and to the carriage. Connection between the lever 43 and lever arm 42 is made by means of an adjustable arm 46 on the lever 43 carrying a roll 47 which bears on arm 42. The link 45 is adjustable in length, being made preferably of two eyebolts and a turn buckle, as shown in Fig. 1.

A shaft 48 is mounted in suitable bearings in the oscillating housing 31 and carries an arm 49, to which there is pivoted a link 50. A part of this link is formed as a partial sleeve open at one side, which embraces loosely a slide or traveler 52 secured to a block 53 which is pivoted at 54 to the lever 43. The slide 52 is adapted to travel in the sleeve 51 between blocks 55 and 56 secured in the latter. The sum of the distances between said blocks and the slide 52 is less than the differential of movement between the shaft 48 and the slide, whereby the latter strikes the blocks alternately in its opposite movements and causes a shifting or obstruction of the link at each end of its movements.

The shaft 48 carries a gear segment 57 which meshes with a complemental gear segment 58 on a shaft 59, also rotatably mounted in the housing 31. To the shaft 59 is secured, within the housing, a gear segment 60 which meshes with the gear segment 26 previously described.

The shaft 48 carries, also within the housing, a rigidly mounted arm 61, on which there is pivoted, by a pivot 62, a dog 63 acted upon by a spring 64, which normally throws its extremity outward from the shaft 48 and brings a tail piece 65 of the dog against a shoulder 66 on the hub part of arm 61. The dog 63 coacts with a trigger arm 67 on a sleeve 68 which surrounds a third shaft 69 mounted in the housing. The sleeve 68 carries a gear segment 70 and an arm 71. Gear segment 70 meshes with a toothed arm 72 mounted in the housing by a pivot 73, and such toothed arm carries a locking projection 74 adapted to enter the notches 30 of the index plate 21, and accurately locate the latter in position after indexing of the work. The notches and lock are complementally beveled at one side to obviate any looseness and insure an exact positioning of the index plate and consequently of the work. A spring 75 is connected to the arm 71 and to an anchor pin 76 fixed in the housing, and exerts force constantly on the lock 74 tending to cause it to enter any one of the notches which stops beside the lock.

The operation of this part of the machine may now be understood and is as follows:

The lever 43 is continuously oscillated at a rate designed to secure a proper working travel of the gear teeth over the active face of the grinding wheel. In this travel, the carriage as a whole, and with it the work spindle, is moved in a reciprocating manner on the guideway. At the same time the housing 31, and with it the work spindle and the former 32, is caused to oscillate back and forth by the weight 38, in a manner governed by the shape of the active face 77 of the former. When, as in this instance, the work pieces are involute gears, the face 77 is an involute curve generated to the same base circle as that of the gear tooth curves, and the face of the abutment on which it coacts is a plane surface substantially parallel to the active face of the grinding wheel. These motions of reciprocation and oscillation give the proper character of rolling motion to the work relatively to the grinding wheel, required to produce face curves in the gear teeth having the proper form.

Owing to the rotational movement which is imposed on the housing in addition to its translative movement, the shaft 48 travels farther and faster in the same direction, on each stroke, than does the slide 52. The lost motion between this slide and the stop blocks 55 and 56, and the free engagement of the slide in the sleeve 51, enables this excess movement of shaft 48 to take place during the major part of the travel of the carriage without causing any rotation of shaft 48 in the housing. But near the end of the downward stroke, the block 55 comes into contact with the slide 52 and arrests the link 50 so that the latter cannot travel any faster than the carriage, wherefore during the last part of the stroke there is a relative backward rotary movement of arm 49 and shaft 48 relatively to the housing. This movement occurs after the tooth being ground has rolled clear of the grinding wheel sufficiently to permit indexing of the work without interference from the grinding wheel. The relative rotation of shaft 48 then acts through the dog 63, trigger 67 and segment 70 to withdraw the lock 74 from the index plate, and it also acts through the gear segments 57 and 58, shaft 59, gear segments 60 and 26, pawl carrier 25 and pawl 27, to advance the ratchet 22 through the angle necessary for indexing. The stroke of the pawl 27 is longer than the distance between the ratchet teeth and it is retracted to a distance back from the nearest ratchet tooth far enough to permit the complete withdrawal of the lock 74 from the index plate before the pawl, in the advancing movement now being described, engages the nearest ratchet tooth and indexes the spindle. Before the end of the movement of shaft 48, the dog 43 passes off from the end of trigger 67, leaving the latter free and permitting the spring 75 to bring the lock 74 immediately into the notch of the index plate arriving beside the latch at the end of the stroke of pawl 27. On the return or upward travel of the carriage, the rotary movement of the housing causes the stop block 56 to be arrested by the slide 52 at a point such that the final part of the travel causes a relative motion of the shaft 48 in the opposite direction sufficient to turn the dog 63 and segment 60 to their former positions and retract the pawl ready for another indexing feed. The dog 63 yields in passing the trigger arm 67 and after passing it springs into the operative position under the influence of spring 64.

The grinding wheel of this machine is shown in Fig. 5 and is designated 78. It is mounted in a stationary location, with provision for rotating about its own axis and its plane active face is mounted parallel with the bearing face of the abutment and at the same side of the tooth being ground as the abutment. That is, where the abutment is at the lefthand side of the former, with reference to Fig. 1, the grinding wheel is also at the lefthand side of the tooth on which it acts. But the face of the abutment and the active face of the grinding wheel are not in the same plane. The planes of these two faces are spaced apart from one another in the appropriate direction and to an appropriate distance for causing the former to engage with the abutment on points more distant from its base circle than the points of the gear tooth faces in engagement with the grinding wheel are from their base circle at any time. This is a feature which conduces greatly to accuracy in the machine and its product, for the former is thus caused to bear only at points remote from the base circle and over a portion of the involute curve which can be produced with great accuracy. Thus even though the tooth curve of the work extends all the way to the base circle of the involute and must be ground as far as it extends, the former need not bear and rub against the abutment as far back as its own base circle. Nevertheless, the rolling movement of the work is guided correctly by the former because its face is the same involute curve as the gear tooth faces.

The abutment is adjustable angularly to compensate for the effects of wear. It is secured to a holder 79 (Figs. 1 and 3) by a bolt 80 which passes through a slot 81 in an upright part of the holder and is adapted to enter any one of several holes 82 in the abutment. An adjusting screw 83 is screwed into the abutment and bears on a ledge 84 of the holder, whereby the abutment may be raised and lowered within the limits imposed by the ends of the slot 81. The holder is pivoted by a pin 85 to a lug 86 rising from a slide 87. An arm 88 is extended from the holder and engaged with a screw 89 set into the slide 87, whereby the holder and the abutment may be adjusted through an angle which, though small, is sufficient to compensate for such wearing of the abutment as will occur in a long period of use.

The slide 87 is mounted in a guideway 90 extending crosswise of the work spindle and is adjustable for the purpose of giving a depth feed to the work. The depth feed results from the fact that shifting of the abutment allows the former and the work spindle to rotate and thus to advance the tooth of the work piece toward the grinding wheel. For thus adjusting the slide, there is mounted transversely in the slide a shaft 91 having an eccentric 92 which carries a roller 93 located between normally fixed jaws 94 and 95. To the shaft 91 is secured an arm 96 operated by a transmission rod 97 from the depth feed cam 98 of the machine. This cam is driven from a shaft 99 which is in geared connection with the main shaft 40 of the machine, said shaft 99 acting through a gear train shown in Fig. 4 to rotate the depth feed cam intermittently at a rate, and in proper timing with the grinding action, which is determined by control means such as are fully described in my prior application Serial No. 595,304. The transmission rod 97 may be engaged in any desired way with the cam and is here shown as engaged with it through the medium of a lever 100 pivoted in the base at 101 and to which the rod is connected by a pivot 102, such lever having a foot 103 which bears on the cam. This particular mechanism is simply a convenient mode of guiding the rod and bringing it to bear on the cam at a point which is out of line with the direction in which the rod is required to move by the exigencies of this particular machine.

The jaws 94 and 95 are adjustable relatively to each other to take up looseness and backlash with the roller 92 and are also adjustable in unison to shift the starting point for the automatic depth feed adjustment. For this purpose, the jaw 94 is formed on a bar 104, and the jaw 95 is formed on a sleeve 105 which fits the bar with provision for movement endwise and is mounted, also in an endwise movable manner, in a tubular extension 106 of the base. A pin 107 set into the base projects into a groove in the sleeve to prevent the latter from rotating while permitting it to move endwise and so holds the jaw 95 in proper relation to the eccentric or cam. A similar pin 108 mounted in the bar 104 enters a groove or slot 109 in the sleeve to prevent rotation of the bar and displacement of the jaw 94, while permitting their endwise adjustment. A nut 110 is threaded on the bar and abuts against the sleeve 105, and by its rotation adjusts the distance between the jaws. These adjustments are secured by a set screw 111 in the nut 110 arranged to bear on the bar. Adjustment of both jaws in unison is effected by a nut 112 on the protruding end of the bar 104 which bears through an intermediate sleeve 113 against the adjacent end of the frame extension in which the bar is confined. Inasmuch as the pressure of the former 32 against the abutment 33 constantly exerts force tending to press the nut 112, and the sleeve 113 toward the frame extension, there is no looseness between the positioning nut and the frame and a positive engagement in one direction only between these parts is sufficient for the purpose. By means of the adjustments last described, the former-controlling abutment 33 may be positioned at any point desired and shifted to compensate for the effects of wear, and compensation may also be made for the effects of wear between the eccentric roll 93 and the jaws between which it is confined. These jaws constitute the reaction elements of the machine base, by means of which the abutment 33 is shifted step by step to feed the work up to the tool between successive cutting operations.

The device shown at 114 in Fig. 5 is an appliance for locating and adjusting the work piece when first applying it to the work spindle and does not embody any features claimed in this specification, wherefore it is not described in detail.

What I claim and desire to secure by Letters Patent is:

1. In a machine of the character described, a movable carriage, a rotatable spindle mounted in said carriage, a former connected with said spindle to control the rotation thereof, a normally stationary abutment arranged to coact with said former to cause rotary movement thereof during reciprocating movements of the carriage, and a yielding force applying means connected with said spindle to apply torque thereto in a direction to press said former against said abutment.

2. In a machine of the character described, a carriage movable back and forth in a given path, a spindle mounted rotatably in said carriage transverse to the direction of said path, a former connected with said spindle to control the rotation thereof, a normally stationary abutment arranged to coact with said former, and a weight coupled to said spindle in a manner to apply torque thereto in a direction to hold said former against said abutment.

3. In a machine of the character described, a spindle and means for giving back and forth rolling movements to said spindle comprising a carriage in which said spindle is rotatably mounted, a supporting structure on which said carriage is movable back and forth in directions transverse to the spindle, a former connected rigidly to the spindle and extending generally radial to the axis thereof, a stationary abutment mounted on the supporting structure, yielding torque applying means connected to the spindle tending to rotate the same in such direction as will press the former against the abutment, and carriage driving means constructed and arranged to shift the carriage in its prescribed path of movement.

4. In a machine of the character described, a spindle and means for giving a rolling movement to said spindle comprising a carriage in which the spindle is rotatably mounted, a supporting structure on which said carriage is mounted with provisions for movement back and forth in a prescribed path transverse to the axis of the spindle, an abutment mounted on the supporting structure, a former connected with the spindle and extending in a generally radial direction with respect thereto, arranged to bear on said abutment, yielding force applying means connected with said spindle tending to turn the same in the direction to press the former against the abutment, whereby it also tends to move the carriage in one direction through the reaction of the former on the abutment, and positive carriage driving means arranged and organized to move the carriage in the opposite direction.

5. In a machine of the character described, a base having an inclined guideway, a carriage mounted to travel back and forth on said guideway, a spindle rotatably mounted in said carriage, a rotation controlling former connected with said spindle, an abutment for said former mounted on the base, and a weight coupled to said spindle in a manner to apply torque tending to press the former against the abutment and at the same time to force the carriage toward the lower end of the guideway.

6. In a machine of the character described, a carriage, a spindle mounted rotatably in said carriage, a backwardly and forwardly moving driver for the carriage, and means for indexing the spindle consisting of a structure rotatable with the spindle and relatively thereto, locking and propelling means interposed between said structure and the spindle, means for effecting rotary movement of said structure during translative movement of the carriage, and means operated by relative movement between the said structure and the carriage driver for actuating the spindle locking and propelling means.

7. In a machine of the character described, a carriage, a driver for moving said carriage back and forth, a rotatable structure mounted on the carriage, means for causing rotary movement of said structure simultaneously with translative movements of the carriage, a holder arranged for rotation concentrically with said structure both simultaneously therewith and relatively thereto, an indexing driver for said holder mounted on said structure, and mechanism controlled by relative movement between the carriage driver and said structure for actuating the indexing driver.

8. In a machine of the character described, a backwardly and forwardly moving carriage, a structure rotatably mounted on said carriage, a driver for moving the carriage translatively, means for causing rotation of said structure at a prescribed rate during the translative movement of the carriage, a work holder mounted coaxially with said structure for rotary movement with and relatively to the same, indexing mechanism between said structure and work holder for indexing the latter, a lock for securing the work holder in indexed relation to said structure, and means operated by relative movement between said structure and the carriage driver for operating said lock and indexing mechanism.

9. In a machine of the character described, a backwardly and forwardly moving carriage, a structure rotatably mounted on said carriage, a driver for moving the carriage translatively, means for causing rotation of said structure at a prescribed rate during the translative movement of the carriage, a work holder mounted coaxially with said structure for rotary movement with and relatively to the same, indexing mechanism between said structure and work holder for indexing the latter, a lock for securing the work holder in indexed relation to said structure, and means comprising an arm pivotally mounted on said structure and a link connected to said arm and having a lost motion engagement with the carriage driver for operating said lock and indexing mechanism at a point near the end of the translative travel of the carriage.

10. In a machine of the character described, a backwardly and forwardly moving carriage, a structure rotatably mounted on said carriage, a driver for moving the carriage translatively, means for causing rotation of said structure at a prescribed rate during the translative movement of the carriage, a work holder mounted coaxially with said structure for rotary movement with and relatively to the same, indexing mechanism between said structure and work holder for indexing the latter, a lock for securing the work holder in indexed relation to said structure, a crank arm mounted on said structure for actuating said lock and indexing mechanism, a link connected to said crank arm, and provided with separated stops, and a traveler connected with the carriage driver operating between said stops and adapted to arrest the link near the end of the translative movement of the carriage in either direction for operating said lock and indexing mechanism.

11. In an apparatus of the character described having a carriage driver and an index operating link, said link having a housing, separated stops mounted in said housing, and a slide connected to the carriage driver mounted in said housing between the stops and adapted to engage them in the course of relative translative movement between the link and driver.

12. In a machine of the character described, work holding means comprising a spindle, a housing in which said spindle is mounted with provision for rotation, a carriage on which the housing is mounted rotatably, and means operated by relative travel between the housing and carriage for unlocking and advancing the spindle through a partial rotation and relocking the spindle after its advancement.

13. In a machine of the character described, work holding means comprising a spindle, a housing in which said spindle is mounted with provision for rotation, a carriage on which the housing is mounted rotatably, and means operated by relative travel between the housing and carriage for unlocking and advancing the spindle through a partial rotation and relocking the spindle after its advancement, said means comprising a ratchet and pawl mechanism mounted in the housing and on the spindle, an index plate and lock therefor carried by the spindle and housing respectively, a shaft pivoted in the housing and geared to said lock and pawl, a crank arm on said shaft, a driver for the carriage, means for rotating the housing simultaneously with translative movement of the carriage, and a link connected to said crank and having a lost motion connection with said driver adapted to oscillate the crank with occurrence of relative motion between the carriage and housing.

14. In a machine of the character described, a carriage, a housing rotatably mounted on the carriage, a spindle rotatably mounted in the housing, a ratchet and index plate mounted on the spindle, a pawl carrier and pawl complemental to said ratchet mounted in the housing, a lock complemental to the index plate mounted in the housing, a driving shaft mounted in the housing, an intermediate shaft in the housing geared to said driving shaft and to the pawl carrier, a second intermediate shaft geared to said lock and having a trigger arm, a spring coupled with said second intermediate shaft exerting force thereon tending to bring the lock into connection with the index plate, and a dog carried by said driving shaft arranged to act on said trigger arm.

15. In a machine of the character described, a carriage, a housing rotatably mounted on the carriage, a spindle rotatably mounted in the housing, a ratchet and index plate mounted on the spindle, a pawl carrier and pawl complemental to said ratchet mounted in the housing, a lock complemental to the index plate mounted in the housing, a driving shaft mounted in the housing, an intermediate shaft in the housing geared to said driving shaft and to the pawl carrier, a second intermediate shaft geared to said lock and having a trigger arm, a spring coupled with said second intermediate shaft exerting force thereon tending to bring the lock into connection with the index plate, and a dog carried by said driving shaft arranged to act on said trigger arm, said dog having a positive abutting engagement with the driving shaft when acting on said trigger arm in a direction to cause withdrawl of the lock, and arranged to pass over the end of said trigger arm at the termination of its active movement, and to yield in passing the arm in the opposite direction.

16. In a machine of the character described having a rotation guiding former and an abutment therefor, an adjustable mount for said abutment comprising a slide, a holder pivoted to the slide and on which the abutment is secured, and means for swinging said holder about its pivot.

17. In a machine of the character described having a rotation controlling former and an abutment therefor, an adjustable holder for said abutment, a cam for shifting said abutment, and automatic mechanism for moving said cam through small steps of rotational movement.

18. In an apparatus as set forth in claim 17, reaction members for said cam comprising jaws embracing the cam and mounted on the bed of the machine.

19. In an apparatus as set forth in claim 17, reaction members for said cam comprising jaws embracing the cam and mounted on the bed of the machine, said jaws being adjustable as to their distance apart and also being adjustable in unison to vary the point of departure for adjusting movements of the abutment holder.

20. In a machine of the character described, the combination with an adjustment producing cam of reaction members embracing said cam, a bar on which one of said members is mounted, a sleeve adjustable lengthwise of the bar on which the other of said members is mounted, means for adjusting said sleeve to regulate the distance between the members, and means for shifting the bar and sleeve in unison to adjust the position of said members on the machine base.

In testimony whereof I have affixed my signature.

EDWIN R. FELLOWS.